O. E. PASKO.
CHURN VALVE.
APPLICATION FILED OCT. 8, 1919.
1,372,244.
Patented Mar. 22, 1921.
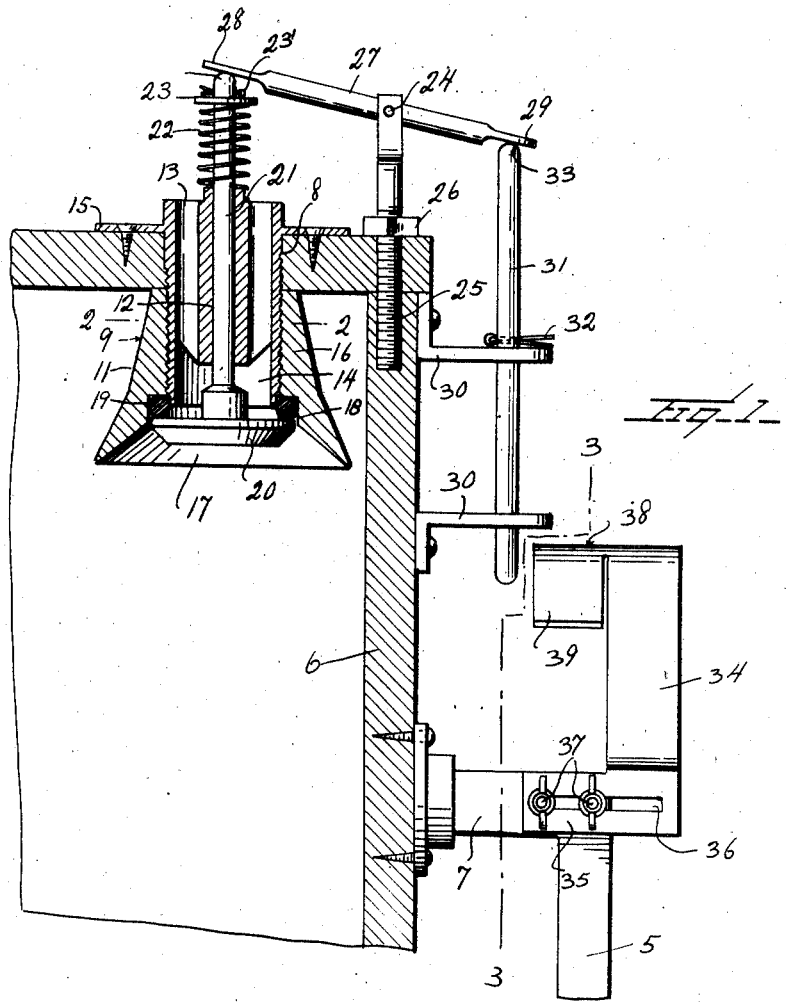
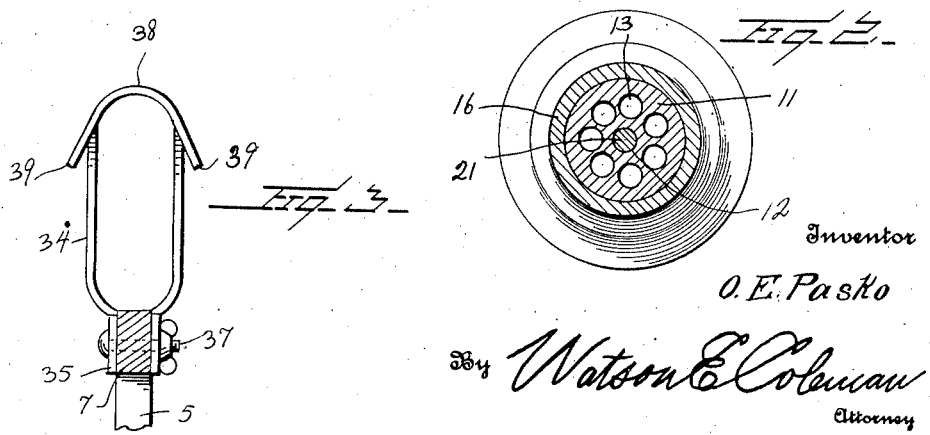
Inventor
O. E. Pasko
By Watson E. Coleman
Attorney

UNITED STATES PATENT OFFICE.

OTIS E. PASKO, OF FOND DU LAC, WISCONSIN.

CHURN-VALVE.

1,372,244.  Specification of Letters Patent.  Patented Mar. 22, 1921.

Application filed October 8, 1919. Serial No. 329,345.

*To all whom it may concern:*

Be it known that I, OTIS E. PASKO, a citizen of the United States, residing at Fond du Lac, in the county of Fond du Lac and State of Wisconsin, have invented certain new and useful Improvements in Churn-Valves, of which the following is a specification, reference being had to the accompanying drawings.

This invention relates to churn valves, and particularly to a valve for rotary churns, and has for its object to provide a device of this character arranged to permit the escape of gas which accumulates in a churn in the churning operation.

Another object is to provide a valve operated by a contact member carried by the churn support to gradually open and close the valve to permit all of the gas to escape.

Another object is to provide a valve having a valve cage including a plurality of exhaust ports in its end, and a flared, open end to prevent the escape of liquid from the churn.

These objects are attained by the mechanism illustrated in the accompanying drawings, in which:—

Figure 1 is a vertical sectional view of the churn valve applied to a churn, the operating member being shown in its inoperative position;

Fig. 2 is a top plan and sectional view of the valve cage;

Fig. 3 is a sectional view taken on the line 3—3 of Fig. 1.

Referring to the drawings, 5 designates a stand or support for the churn, and 6 a rotary churn mounted on trunnions 7 carried by the support 5. An opening 8 is formed in the side of the churn adjacent one end and is adapted to receive a valve cage 9.

The valve cake comprises a core 11 having a central bearing 12 extending longitudinally of the core. A series of exhaust ports 13 are disposed around the bearing between the same and the core, and are intended to permit the escape of gas from the churn to the atmosphere. The lower end of the bearing 12 terminates adjacent the lower end of the core to provide a gas receiving chamber 14 adapted to receive the gas before it is distributed through the exhaust ports 13. The upper end of the core includes a plate 15 adapted to hold the core in engagement with the churn, the other end of the core extending through the side of the churn, and being exteriorly threaded to receive an interiorly threaded casing 16. This casing is bell-shaped and also includes a flared end 17. An annular recess 18 is provided at the base of the flared portion 17 and is intended to receive the packing ring 19. This forms the valve seat of the cage the bell-shaped casing and its flared end serving to prevent the escape of liquid from the churn during the operation of the valve. A valve 20 including a valve stem 21 is disposed in the cage, the stem being slidably mounted in the bearing 12, while the valve engages the packing ring 19. An expansion spring 22 is disposed on the upper end of the valve stem 21 and engages the upper portion of the bearing 12 at one end, and is held in engagement with the stem by means of a washer 23 and a cotter pin 23'.

Disposed on the outside of the churn, adjacent the upper end of the valve, is a fulcrum 24 which is threaded into the churn, as at 25, and held in position by means of a nut 26. The upper end of the fulcrum pivotally supports a rock arm 27 at its intermediate portion. One end 28 of the rock arm is flattened and intended to engage the upper end of the valve stem to open the valve. The other end 29 of the rock arm extends over the side of the churn and is also flattened. Carried by the end of the churn adjacent the fulcrum are a plurality of brackets 30 in which a tappet rod 31 is slidably mounted, the downward movement of the tappet rod being limited by a cotter pin 32. The end 33 of the tappet rod is intended to engage the end 29 of the rock arm.

In order to operate the tappet rod, an operating member 34 is provided, and consists of a U-shaped member having its side cut away to provide extending wings 35 at its ends. Each wing is longitudinally slotted, as at 36, the support for the churn being arranged to be disposed between the wings. A pair of bolts 37 pass through the support 5 and the slots 36 and detachably connect the operating member to the support. The bight portion of the U-shaped member includes an extension 38 having ends 39 which are inclined downwardly, the upper portion of the extension being round to provide an unobstructed contact or cam surface. The member 34 may be adjusted on the support 5 to move the wings 39 into and out of operating position with reference to the tappet rod 31.

In the use of the device, the operating member 34 is positioned on the support 5 so that the extension 38 is in alinement with the tappet rod 31. As the churn revolves, the lower end of the tappet rod 31 contacts with one of the ends 39 of the extension and moves the tappet rod upwardly to cause contact between the end 33 of the tappet rod and the end 29 of the rock arm, the latter being raised upwardly with the tappet rod. The end 28 of the rock arm swings downwardly in engagement with the valve stem 18 and depresses the same so as to disengage the valve from the valve seat and permit the escape of gas. In view of the inclined ends of the extension 38, the valve is gradually opened and closed. When the tappet rod 31 is disengaged from the extension 38, the spring 21 expands and returns the rock arm and tappet rod to their former positions and forces the valve 19 into firm engagement with the valve seat. After the churn and valve mechanism have been operating for a certain length of time, in the churning operation, all of the gas is exhausted from the churn so that the operation of the valve is unnecessary during the rest of the churning operation. In view of this, the operating member 34 can be unfastened and moved outwardly so as to prevent contact of the extension 38 with the tappet rod. This is possible in view of the elongated slots 36 in the ends of the operating member. The churn will then operate as usual without the operation of the valve.

From the foregoing, it will be readily seen that by the novel form of valve mechanism including the tapering or bell-shaped valve cage, all of the gas will be easily exhausted through the valve cage without danger of the escape of liquid from the churn. In addition to this, the novel construction of the extension on the operating member permits the gradual opening and closing of the valve in accordance with the speed of rotation of the churn so that all gas is permitted to escape, the operating member being detachable to prevent unnecessary operation of the valve mechanism.

I claim—

1. A device of the character described comprising a churn, a valve core carried by said churn, said core having a plurality of passages extending longitudinally thereof, a valve cage threaded on the core within the churn, said cage having a recess formed inwardly of one end, a portion of said valve core extending beyond the end wall of the recess, a packing ring disposed within said recess between the side wall thereof and the projecting portion of the core, a spring pressed valve mounted in said core, said valve being adapted to engage the packing ring, and means for operating said valve.

2. A device of the character described comprising a churn and a churn support, a valve mechanism carried by said churn, a fulcrum carried by the churn adjacent the valve mechanism, a rod pivoted at its intermediate portion to the fulcrum, the ends of said rod being free, one end of said rod being adapted to operatively engage the valve mechanism, brackets carried by said churn, a tappet rod freely mounted in said brackets and having one of its ends disposed adjacent one end of the rod of the fulcrum in right angular relation thereto, and an operative member adjustably mounted on the churn support, said member being movable into and out of operative position with respect to the other end of the tappet rod.

3. The combination with a support, of a valve core having a bearing centrally thereof and a series of longitudinal passages around said bearing, said core being supported by and extending through the support, a flange on one end of the core adapted to engage one face of the support, a cage having its inner surface threaded and engaged with the exterior surface of the core, one end of said cage being disposed in engagement with the other face of the support, the other end of said cage being flared and having a recess inwardly of said flared portion, the end of the core extending beyond the end wall of the recess to form one side wall of said recess, a packing ring disposed in said recess, a valve including a valve stem, said valve stem being slidable in the bearing and having its end extending beyond the end of the bearing, a spring surrounding the end of the stem, one end of said spring engaging the end of the bearing, and means for operating the valve, said valve being operable within the flared end of the cage.

In testimony whereof I hereunto affix my signature.

OTIS E. PASKO.